United States Patent [19]
Kohler et al.

[11] Patent Number: 5,128,219
[45] Date of Patent: Jul. 7, 1992

[54] GAS-TIGHT, SEALED METAL OXIDE/HYDROGEN STORAGE BATTERY

[75] Inventors: Uwe Kohler; Gerhard Simon, both of Kelkheim; Gunter Hofmann, Hofheim, all of Fed. Rep. of Germany

[73] Assignee: Varta Batterie Aktiengesellschaft, Hanover, Fed. Rep. of Germany

[21] Appl. No.: 568,832

[22] Filed: Aug. 17, 1990

[30] Foreign Application Priority Data

Sep. 4, 1989 [DE] Fed. Rep. of Germany ....... 3929306

[51] Int. Cl.$^5$ ............................................. H01M 4/24
[52] U.S. Cl. ........................................ 429/59; 429/57; 502/101
[58] Field of Search ...................... 429/57, 59; 502/101

[56] References Cited

U.S. PATENT DOCUMENTS

| | | | |
|---|---|---|---|
| 2,905,739 | 9/1959 | Straus | 429/57 |
| 3,620,844 | 11/1971 | Wicke | 429/44 |
| 3,920,475 | 11/1975 | Nabiullin et al. | 429/82 |
| 4,022,949 | 5/1977 | Nabiullin et al. | 429/28 |
| 4,445,989 | 5/1984 | Kumar et al. | 204/147 |
| 4,997,729 | 3/1991 | Hatoh et al. | 429/40 |
| 4,997,732 | 3/1991 | Austin et al. | 429/153 |

*Primary Examiner*—Anthony McFarlane
*Attorney, Agent, or Firm*—Weiser & Stapler

[57] ABSTRACT

In a metal oxide/hydrogen storage battery, preferably formed as a coiled cell or as a button cell, having a negative electrode, a positive electrode, and an intermediate separator, the oxidation-sensitive negative electrode is protected against diffusing oxygen by a metallic covering of the electrode's metal hydride particles, and the oxygen reduction necessary for gas-tight operation is transferred to an auxiliary electrode which is arranged outside of the ionic path between the positive and negative electrodes. Metals with high solubility for hydrogen, such as Pd, Ni and Cu, are suitable as the covering material. The auxiliary electrode is formed as a film based on a mixture of activated carbon, a PTFE binder and conducting graphite, and is either laminated onto the negative metal hydride electrode or is spatially separated from the main electrodes, depending upon the cell's overall construction.

13 Claims, 1 Drawing Sheet

GAS-TIGHT, SEALED METAL OXIDE/HYDROGEN STORAGE BATTERY

BACKGROUND OF THE INVENTION

This invention is directed to a gas-tight, sealed metal oxide/hydrogen storage battery with a positive metal oxide electrode, a negative hydrogen electrode, a separator arranged between the positive and negative electrodes and containing an alkaline electrolyte, and means for the catalytic recombination of oxygen developed at the positive electrode in the event of overcharging.

Well-known among secondary cells of this general type are metal oxide/hydrogen storage batteries having negative electrodes synthesized from alloys of the La/Ni or Ti/Ni systems. These alloys also frequently contain V, Cr, Zr, Mn, Al, Co, and the like, as secondary components.

As in the case of gas-tight nickel/cadmium storage batteries, the gas-tight operation of these cells requires continuous elimination of the oxygen which is developed at the positive electrode in the event of overcharging. This is because, due to the lower output capacity of the positive electrode, the production of oxygen generally takes place as a result of direct electrochemical reduction at the negative electrode, i.e., the cells operate "in an oxygen cycle".

However, unlike the nickel/cadmium storage battery, for the cells being considered here, the developing oxygen must be transferred to a negative electrode which is a hydrogen-storing metal hydride. Therefore, it must be assumed that on this electrode, both a chemical reaction of oxygen with the stored hydrogen ($H_{st}$) will occur (Equation 1), and an electrochemical reduction of oxygen will take place on the electrode surface (Equation 2):

$$4H_{st} + O_2 = 2H_2O \quad (1)$$

$$2H_2O + O_2 + 4e = 4OH \quad (2)$$

However, in addition to these processes, which are not critical to the operability of the active mass, a parasitic side reaction is possible which can adversely affect the electrochemical properties of the active mass. In this side reaction, oxygen coming from the positive electrode can form oxides with the components of the active mass (alloy), as follows:

$$2 \times Me + O_2 = 2Me_xO$$

Since these oxides tend to develop on the surface of the metal hydride particles, such oxides can considerably hinder the dynamics of hydrogen take-up and emission when charging and discharging. Consequently, the negative electrodes of metal oxide-hydrogen storage cells are exposed to the risk of corrosion.

In order to prevent this, it is suggested in DE-PS 28 38 857 to allow the oxygen consumption reaction to occur on an auxiliary electrode which is only in electron-conducting contact with the alloy electrode(s). For this purpose, an electrode arrangement is disclosed in which an auxiliary electrode is located between two positive electrodes in the electrode stack or group, and a first separator is provided which surrounds the auxiliary electrode, and which by means of its highly porous and hydrophobic nature promotes the flow of oxygen to the auxiliary electrode, while a second hydrophilic separator of lower gas permeability is positioned to separate the positive electrode from the negative electrode, to hinder the access of oxygen to the latter structure. However, the requirement of two different separator materials, and their arrangement between the plates for proper operation, requires special attention during assembly and tends to make the construction of such a storage battery rather complicated.

SUMMARY OF THE INVENTION

It is therefore the primary object of the present invention to provide a storage battery of the type previously mentioned in which the negative electrode is more effectively protected from the corrosive effects of oxygen.

It is also an object of the present invention to provide a storage battery of this general type, wherein the necessary reduction of oxygen is achieved by simple and straightforward means.

These and other objects are achieved in accordance with the present invention by providing a gas-tight sealed metal oxide/hydrogen storage battery having a positive metal oxide electrode, a negative hydrogen electrode, and a separator arranged between the positive and negative electrodes and containing an alkaline electrolyte, with improved means for the catalytic recombination of oxygen developed at the positive electrode in the event of overcharging. To this end, for the protection of the negative electrode against the flow of oxygen, the metal hydride particles are provided with a covering made of a metal which has a low affinity for oxygen, but which has a high absorbency relative to hydrogen, and the means employed for maintaining an effective consumption of oxygen are positioned outside of the ionic path between the positive and the negative electrodes, but in electrically conducting contact with the negative electrode.

Accordingly, the essence of the invention is that the negative electrode is effectively shielded against the access of oxygen, and the reduction of oxygen takes place to the extent possible in outer regions of the electrode arrangement (group), or at least on peripheral portions of the negative electrode.

For further detail regarding a metal oxide/hydrogen storage battery produced according to the present invention, reference is made to the detailed description which is provided below, taken in conjunction with the following illustrations.

BRIEF DESCRIPTION OF THE DRAWINGS

In the several views provided, like reference numbers denote similar structures.

DETAILED DESCRIPTION OF THE PREFERRED EMBODIMENTS

Generally, it has been found that improved protection of the negative electrode of the storage battery is achieved by coating or covering the hydride-forming alloy on which the electrode is based with a metal which exhibits a high absorbency for hydrogen, but which does not permit the passage of oxygen. Metals having such properties, and which are therefore considered useful in developing such a covering, preferably include Pd, Ni and Cu.

Coating of the particles can be accomplished by galvanically treating the alloy powder before it is pressed into a metal hydride electrode, in a bath solution which contains ions of one of the above-mentioned metals, or by depositing the selected metal onto the alloy powder from a salt solution by means of a chemical reducing agent. Such coating of the metal hydride particles in accordance with the present invention promotes a consistently high activity relative to the take-up and emission of hydrogen, so that extended cycling of the storage battery is ensured.

Instead of the negative electrode, other means are available for promoting catalytic oxygen reduction, one example being the auxiliary electrode. In accordance with the present invention, such means should be positioned in the cell so that on the one hand, such means are in electrically conducting contact with the negative electrode, but on the other hand, such means lie outside of the ionic path between the positive and negative electrodes. To develop such an arrangement, the auxiliary electrode can, for example, be positioned on the outer side of the terminating (outermost) negative electrode in the electrode stack, or can be shielded from negative electrodes on both sides (positioned against a positive electrode), or can be spatially separated from the grouping of positive and negative (main) electrodes.

It has been found that the improvements of the present invention find particular applicability to coil-type metal oxide/hydrogen cells. In these cells the oxygen-consuming film is favorably applied to the outer side of the negative band electrode which forms the outer coil (spiral) for the electrode structure. As a result of this placement, the (pressed or rolled) film is simultaneously placed in electrical and mechanical contact with the housing vessel.

Figure 1:
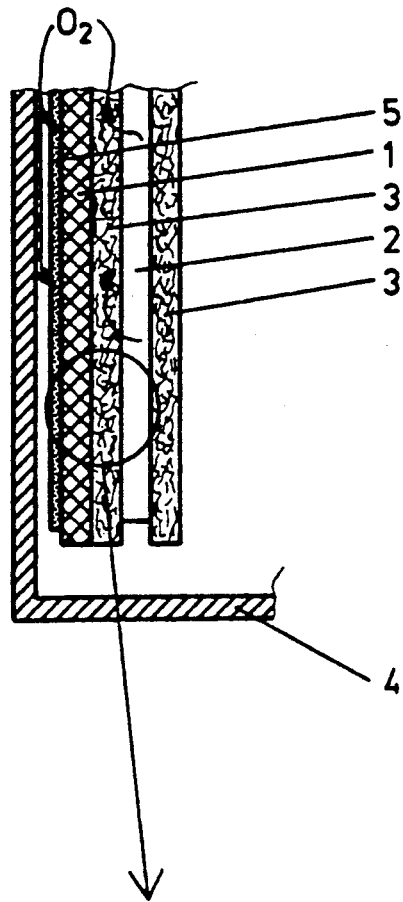
FIG. 1 is a partial, cross-sectional view showing a coiled metal oxide/hydrogen storage battery with a negative electrode which, in accordance with the present invention is protected against oxygen corrosion and which is provided with an auxiliary electrode for the catalytic consumption of oxygen.

To illustrate this, FIG. 1 shows portions of a coil-type metal oxide/hydrogen cell having a negative metal hydride electrode 1 which is protected against corrosion as will be discussed more fully below. The negative electrode 1 is separated on its inner side from the positive electrode 2 by a 10 separator formed of a nonwoven fabric 3, and is covered on its outer side with an auxiliary electrode 5 forming an oxygen-consuming layer facing the housing vessel 4. The consumption layer (the auxiliary electrode 5) is developed as a film which is directly laminated onto the negative electrode band 1.

The auxiliary electrode 5 for maintaining the consumption of oxygen is produced by mixing activated carbon with conducting carbon black and a binder, and by subsequently rolling the mixture into a film. The composition of the initial mixture should in accordance with the present invention be 50 wt. % to 80 wt. % activated carbon, 3 wt. % to 20 wt. % conducting carbon black, and 10 wt. % to 30 wt. % PTFE binder. A rolled mixture of about 75 wt. % activated carbon, 7.5 wt. % conducting carbon black and 17.5 wt. % PTFE is particularly advantageous.

As a result of the foregoing, the active mass of the negative electrode is effectively shielded against oxygen flowing out of the positive electrode. Rather, this oxygen is directed toward the outer regions of the electrode coil and is reduced on the consumption layer.

Figure 2:
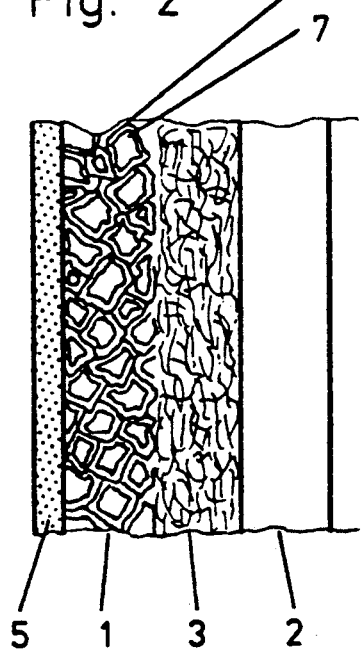
FIG. 2 is an enlarged, partial cross-sectional view of the electrode arrangement of FIG. 1.

FIG. 2 is an enlarged view showing the improvements of the present invention in greater detail. As illustrated, the negative electrode 1 includes a metallic covering 6 formed on the active metal hydride (hydrogen-storing alloy) particles 7. Due to their high specific proton conductivity and/or their high specific solubility for hydrogen, the metallic covering 6 is preferably comprised of Pd, Ni or Cu. This on the one hand ensures good operability of the hydrogen-storing electrode, and on the other hand protects the electrode against oxidative destruction for a significant period of time.

The electrode arrangement of a coiled cell also makes it possible to position the auxiliary electrode which is provided for oxygen consumption completely outside of the electrode coil, but in electrically conducting contact with the negative electrode. To this end, the auxiliary electrode can take the form of a disk, or a stack of plural disks, placed at an end (side) of the coil, for example, near the bottom of the cell.

Figure 3:
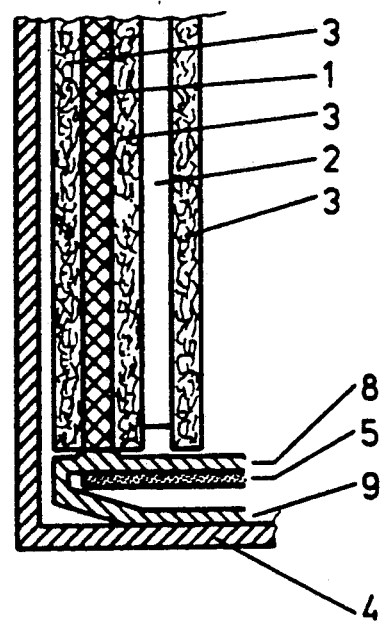
FIG. 3 is an enlarged, partial cross-sectional view of an electrode arrangement similar to FIG. 1, but with an auxiliary electrode which is separated from the negative electrode.

As shown in FIG. 3, such an auxiliary electrode 5 can be advantageously connected to the negative electrode 1 with a multi-contact plate 8 which, in this case, forms the current conductor for the negative electrode 1. The multi-contact plate 8 is in turn electrically connected with the housing vessel 4 (which serves as the outer cell pole) by a tongue-like projection 9. In this case, the disk-shaped auxiliary electrode 5 can be integrated as an insert in the multi-contact plate 8, as shown.

Figure 4:
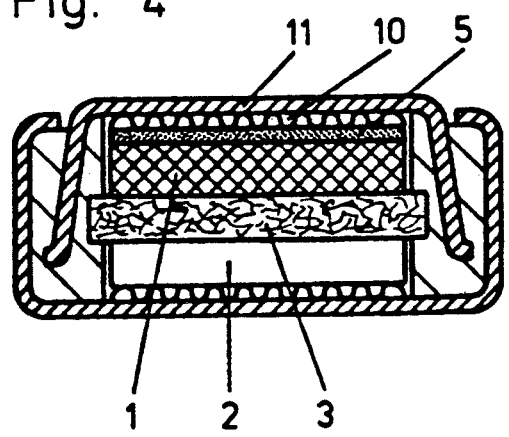
FIG. 4 is a cross-sectional view showing a button cell developed in accordance with the present invention.

In similar fashion, the improvements of the present invention can also be applied to hydrogen storage batteries formed as button cells. For example, as shown in FIG. 4, the negative electrode 1 may be protected against corrosion with a coating of the metal hydride particles that is impermeable to oxygen. When employed in a button cell, with its tablet-shaped electrodes, reduction of the oxygen pressure developed in the cell is achieved with an auxiliary (consumption) electrode 5 that is spatially separated from the negative electrode. Irrespective of the housing's construction, which can be freely varied, the illustrative cell exhibits an arrangement of the negative metal hydride electrode 1 which is protected against the access of oxygen in accordance with the present invention. Important to note is that the positive metal oxide electrode 2, as well as the separator 3 located between the two electrodes and containing the electrolyte, and the auxiliary (oxygen-consumption) electrode 5, lie on opposite (outer) sides of the negative electrode 1. A contact spring 10 provides for a gap between the cell's cover 11 and the auxiliary electrode 5 so that oxygen can diffuse from the auxiliary electrode 5 in unhindered fashion.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A gas-tight sealed metal oxide/hydrogen storage battery with a positive metal oxide electrode, a negative hydrogen electrode, a separator arranged between the positive and negative electrode and containing an alkaline electrolyte, means for protecting the negative electrode against oxygen comprising a covering for the negative electrode wherein the covering is made of a metal which has a low affinity for oxygen, but a high absorbency for hydrogen, and means for catalytic recombination of oxygen developed, at the post upon overcharging, positioned outside of an ionic path defined between the positive and negative electrode, but in electrically conducting contact with the negative electrode.

2. The storage battery of claim 1 wherein the covering is a metal selected from the group consisting of Pd, Ni and Cu.

3. The storage battery of claim 2 wherein the catalytic recombination means is a layer rolled from an activated carbon mixture.

4. The storage battery of claim 3 wherein the activated carbon mixture is comprised of 50 wt. % to 80 wt. % activated carbon, 3 wt. % to 20 wt. % conducting carbon black, and 10 wt. % to 30 wt. % PTFE.

5. The storage battery of claim 4 wherein the activated carbon mixture is comprised of about 75 wt. % activated carbon, about 7.5 wt. % conducting carbon black and about 17.5 wt. % PTFE.

6. The storage battery of claim 1 wherein the storage battery is formed as a coiled cell.

7. The storage battery of claim 6 wherein the catalytic recombination means is applied to outer side portions of the negative electrode and is in contact with a housing vessel for the storage battery.

8. The storage battery of claim 6 wherein the catalytic recombination means is formed as one or more disks positioned at an end of the coiled electrode structure.

9. The storage battery of claim 8 wherein the disks are integrated into a multi-contact plate in contact with the negative electrode.

10. The storage battery of claim 1 wherein the storage battery is a button cell.

11. The storage battery of claim 1 wherein the means for catalytic recombination of oxygen is separate from and in electrically conducting contact with the negative electrode.

12. The storage battery of claim 1 wherein the means for catalytic recombination of oxygen is an auxiliary electrode structure.

13. A gas-tight sealed metal oxide/hydrogen storage battery which is subject to cyclic alternating loads, which is operative at room temperature, and which includes a positive metal oxide electrode, a negative hydrogen electrode, a separator arranged between the positive and negative electrode and containing an alkaline electrolyte, means for protecting the negative electrode against oxygen comprising a covering for the negative electrode, which covering is made of a metal which has a low affinity for oxygen, but a high absorbency for hydrogen, and means for catalytic recombination of oxygen developed at the positive electrode upon overcharging, positioned outside of an ionic path which extends between the positive and negative electrode, and which is separate from but in electrically conducting contact with the negative electrode.

* * * * *